United States Patent [19]
Klein et al.

[11] Patent Number: 6,113,300
[45] Date of Patent: Sep. 5, 2000

[54] MODULAR UNIT, METHOD AND DEVICE FOR INSERTING SAME

[75] Inventors: Lothar Klein; Hartmut Carstensen, both of Berlin, Germany

[73] Assignee: DaimlerChrysler AG, Germany

[21] Appl. No.: 09/051,946

[22] PCT Filed: Aug. 13, 1997

[86] PCT No.: PCT/EP97/04390

§ 371 Date: Aug. 5, 1998

§ 102(e) Date: Aug. 5, 1998

[87] PCT Pub. No.: WO98/07605

PCT Pub. Date: Feb. 26, 1998

[30] Foreign Application Priority Data

Aug. 24, 1996 [DE] Germany .......................... 196 34 217

[51] Int. Cl.$^7$ .................................................. F16B 2/04
[52] U.S. Cl. ............................... 403/31; 403/5; 403/337; 296/29
[58] Field of Search .................. 403/31, 5, 335, 403/337, 363; 52/586.1, 742.13, 587.1, 259, 742.1, 742.14; 296/29

[56] References Cited

U.S. PATENT DOCUMENTS

| | | | |
|---|---|---|---|
| 2,644,553 | 7/1953 | Cushman | 403/5 |
| 2,750,014 | 6/1956 | Gordon | 403/5 |
| 3,771,277 | 11/1973 | Rausch et al. | 52/586.1 |
| 3,815,306 | 6/1974 | Tantlinger | 296/29 |
| 4,389,589 | 6/1983 | Schustek | 310/258 |
| 4,531,856 | 7/1985 | Gebelius | 403/5 X |
| 4,532,747 | 8/1985 | Koetje | 52/586.1 |
| 4,722,633 | 2/1988 | Bergheim et al. | 403/5 X |
| 4,915,537 | 4/1990 | Bergheim et al. | 403/5 X |
| 5,482,321 | 1/1996 | Soeffge et al. | 296/29 X |
| 5,548,937 | 8/1996 | Shimonohara | 52/586.1 |

FOREIGN PATENT DOCUMENTS

| | | |
|---|---|---|
| 1603258 | 3/1971 | France . |
| 2703114 | 9/1994 | France . |
| 266206 | 11/1968 | Germany . |
| 1480643 | 10/1969 | Germany . |
| 2207334 | 9/1972 | Germany . |
| 2530912 | 1/1976 | Germany . |
| 2934075 | 8/1979 | Germany . |
| 3424690 | 1/1986 | Germany . |
| 3538188 | 10/1986 | Germany . |
| 3529662 | 2/1987 | Germany . |
| 4012206 | 10/1991 | Germany . |
| 9212896 | 1/1993 | Germany . |
| 9305321 | 7/1993 | Germany . |
| 4410998 | 10/1995 | Germany . |
| 29516147 | 1/1996 | Germany . |
| 504339 | 3/1971 | Switzerland . |
| 512697 | 9/1971 | Switzerland . |

OTHER PUBLICATIONS

"Starre und gelenkige Verbindungen", Fügetechnik am Strangpressprofil:, A. Koewius—Teil 2, Jul. 1990, F+K p. 18, Jun. 1990, F+K p. 40.

*Primary Examiner*—Terry Lee Melius
*Assistant Examiner*—David E. Bochna
*Attorney, Agent, or Firm*—Webb Ziesenheim Logsdon Orkin & Hanson, P.C.

[57] ABSTRACT

The invention relates to a modular unit consisting of two building components having joint surfaces arranged in pairs to be fastened with rivets. In order to ensure perfect meeting of the pairs of joint surfaces, there is a pair of bearing surfaces designed in such a way that, upon exerting a supporting force thereon, a force component is generated through the assembling joints.

9 Claims, 2 Drawing Sheets

MODULAR UNIT, METHOD AND DEVICE FOR INSERTING SAME

BACKGROUND OF THE INVENTION

1. Field of the Invention

This invention relates to a modular unit with two components, a method for joining said components and an assembly device for said purpose.

2. Description of Prior Art

A prior art modular unit as shown, for example, in EP 0 405 889 A2 has two wall panels of a railway freight car body which have joint surfaces which correspond to one another in pairs. For connection of the joint surfaces which fit together on the two components, there is a separate connecting element which is inserted between the components and has connection brackets which are adapted to the surfaces to be connected. The joint surfaces which correspond to one another thereby each lie in a common flat or curved plane, and are located at some distance from one another, which distance is then bridged by the connecting piece. The use of a separate connecting piece entails a corresponding effort and expense, whereby, on the connecting piece two independent joint connections are required for each pair of joint surfaces to be connected. The connecting piece is therefore defined so that it has a cross section in the shape of an H and is engaged with the free ends of its legs between parallel wall segments of the wall panels. The distance between the legs, which are to be inserted into a panel, must therefore be exactly adapted to the distance between the outside walls of the panel, which entails additional effort and expense. In addition, when gaps do occur between the joint surfaces, external clamping means must be used to bring the outer walls of the panel closer to the joint brackets on the connecting piece.

The object of the invention is to create a modular unit which has integrated joining accessories and can be assembled in a simple manner, and in which an assembly device which has a simple construction can be used to make the connection.

SUMMARY OF THE INVENTION

The invention teaches that this object can be achieved by the features of the invention.

In one configuration of a modular unit, one component is engaged with a molded extension which is provided for joining purposes with at least one joint surface in a mating receptacle on the second component. The mating receptacle thereby has a joint surface which is flat and parallel to the joint surface of the extension inserted into it and, as a rule, initially faces it with some distance between them.

Corresponding to the joint surfaces, on the respective components, there are bearing surfaces which face one another when the components are inserted one into the other. The bearing surface on the component to be inserted is thereby on a wall of the component facing away from the corresponding joint surface, while the joint surface of the component provided with the mating receptacle is defined in the form of a component wall which faces the corresponding joint surface. The distance between the joint surface and the bearing surface on the component with the mating receptacle is greater than the distance between the joint surface and the bearing surface of the component which is provided with the extension. This distance varies, depending on the manufacturing tolerances of the components, between ½ mm and several millimeters. A component constructed in this manner makes it possible to insert a pressure element between the bearing surfaces which causes a relative displacement of the components such that any gap which exists between the joint surfaces which are to be brought into contact with one another is eliminated altogether, or at least so that mechanical joint elements, e.g. BOM blind rivets, can be used for clamping purposes in the vicinity of the joint surfaces. The bearing force to be introduced between the bearing surfaces accordingly has a force component which is directed perpendicular to the joint surface. Such blind rivets can only be used if there are relatively narrow joint gaps of less than 1–2 mm between the joint surfaces. These blind rivets have the advantage, however, that they can be inserted blind, i.e. from one side. An additional advantage is that the assembly process can be performed quickly and easily, achieving high mechanical tensile and shear strength under static and dynamic loads on the joint, as well as an improved vibration strength. The joint seam is also at least largely gas and moisture-tight, once a constant clamping force has been achieved. This effect is enhanced by the fact that the direction of the force of the joint element is perpendicular to the joint surfaces, to press the latter together. If there is an offset between the direction of force and the axis of the rivet, the torque which results is absorbed by the use of the joining element on both sides on the component to generate torques in opposite directions.

To bring the joint surfaces of the two components into close contact with one another, this structure requires the introduction between the facing bearing surfaces of the two components of a bearing force which is exerted toward the joint surface. This bearing force is increased to such a level that the joint surfaces are nonpositively connected to one another or on longer components, in addition to the points where the joining surfaces are in direct contact, the distance between the joint surfaces is reduced to a very small dimension of less than 1 mm. Then, these joint surfaces or the immediately adjacent clamping brackets etc. are drilled through and are clamped together with connecting elements, in particular with BOM blind rivets.

As the assembly device for components configured in this manner, to generate the bearing force, it is possible to introduce a pneumatically or hydraulically expandable expansion body, preferably a hose in a loose, flexible condition which is then filled with a fluid under pressure, and as a result of its radial expansion brings the joint surfaces into at least partial contact. To achieve a stable final position of the hose, at least one of the bearing surfaces has a concave depression, so that the components cannot move at right angles to their displacement force which is directed toward the joint surfaces.

The invention is explained in greater detail below with reference to the exemplary embodiments which are illustrated schematically in the accompanying drawings.

DETAILED DESCRIPTION OF THE PREFERRED EMBODIMENTS

Figure 1:
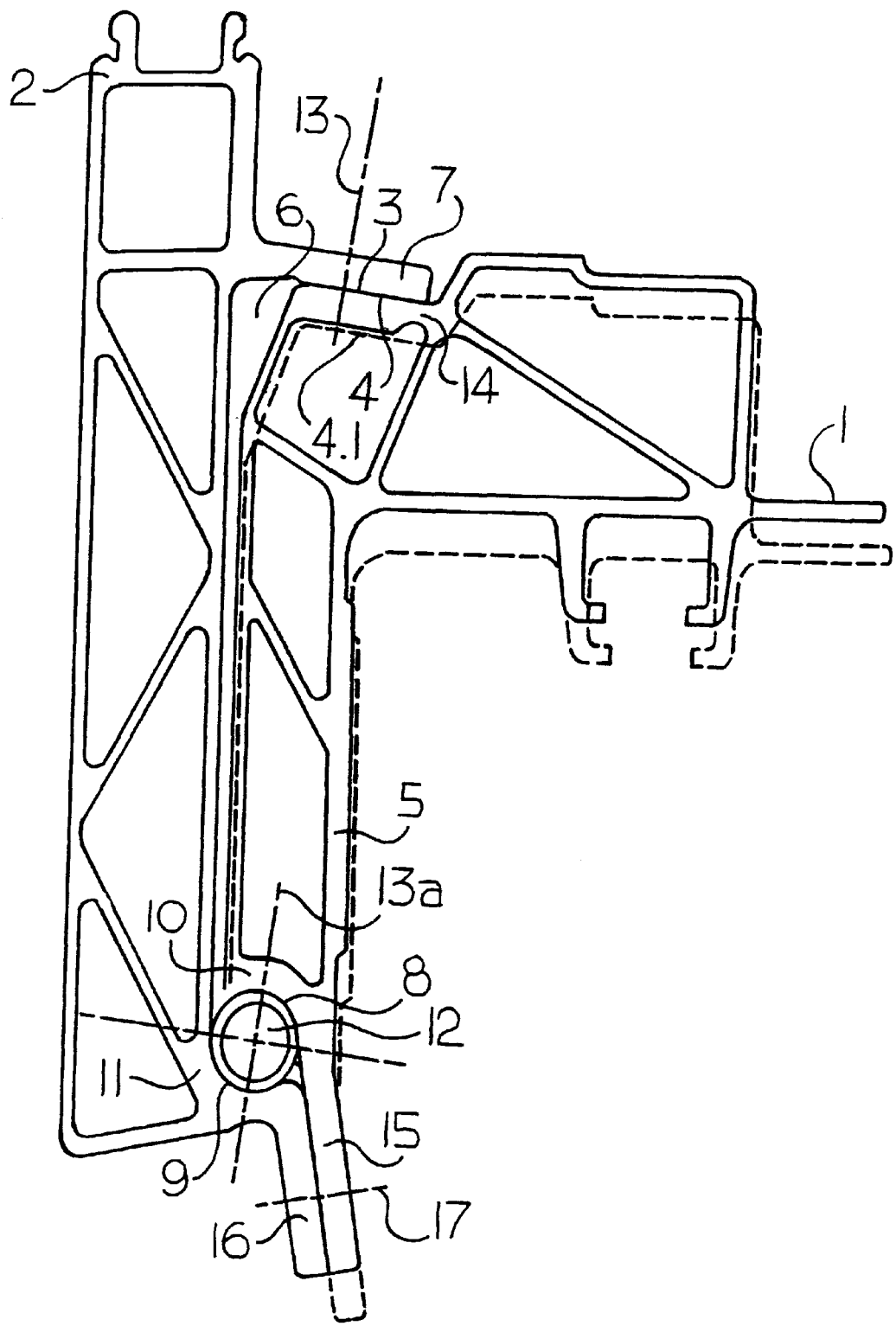
FIG. 1 shows a modular unit which consists of two components standing at an angle in relation to one another.

Two components 1, 2 which are preferably defined in the form of wall modules made of extruded profiles for freight car bodies of railway vehicles, are partly engaged with one another and are provided with joint surfaces 3 and 4 which correspond to one another to achieve a close-fitting connection. On the first component 1 there is an extension 5 which can be engaged in a mating receptacle 6 on the other component 2. The mating receptacle 6 is thereby defined with a cross-section in the shape of a horizontal U, whereby the corresponding joint surface 3 is provided on an angular web 7, and is at least substantially perpendicular to the plane of the corresponding component 2, although in the concrete case the inclination is an angle of approximately 8 degrees. Correspondingly, the joint surface 4 on the extension 5 of the first component, when it is inserted into the mating receptacle 6 and lies in a parallel plane, and thus, before the panels are clamped together is generally at some distance from the joint surface 3 and parallel to it, as indicted by the broken line. To bring the joint surfaces into the at least largely gap-free mutual contact illustrated in solid lines, there are bearing surfaces 8 and 9 on the extension 5 and on the mating receptacle 6, respectively. These bearing surfaces 8, 9 face one another. The bearing surface 8 of the first component 1 is thereby provided on a component wall 10 of the extension 5 and is oriented so that it is in contact with the side of this component wall 10 which faces away from the corresponding joint surface 4. On the other hand, the bearing surface 9 of the mating receptacle 6 is on an angular web 11 which runs essentially parallel to the first angular web 7 or to the corresponding bearing surface 8, on the side facing the joint surface 3. The bearing surfaces 8, 9 are defined in the form of concave depressions, such that they form segments of a circle with a common center.

To completely eliminate the initial gap between the joint surfaces 3 and 4.1, an expansion body in the form of a hose 12 is introduced between the bearing surfaces 8, 9. The hose 12 is filled with compressed air, oil or a corresponding fluid at a pressure such that the components 1, 2 are adjusted relative to one another until the joint surfaces 3, 4 are brought close to one another in the position illustrated in solid lines. While maintaining the pressure in the hose 12, a boring indicated by a center line 13 can then be made through the angular web and the component wall 14 provided with the joint surface 4, and then the surfaces can be clamped together with a BOM blind rivet. The bearing surfaces 8, 9 are thereby oriented in relation to the joint surfaces 3, 4 so that a force component generated by the expansion body runs through the joint surfaces 3, 4, and the bearing surfaces 8, 9 are oriented with respect to one another so that at least a common normal line runs through the joint surfaces 3, 4. This force component is illustrated by the broken line 13a which, in the exemplary embodiment illustrated in FIG. 1, is at least approximately aligned with the center line 13. Following the insertion of the rivet, the hose 12 can be decompressed and removed from the gap between the bearing surfaces 8, 9 if necessary, or it can be left in place to act as a seal. Following this joining process, an additional connection between the components 1 and 2 can be made by drilling through the neighboring clamping rackets 15, 16 provided both on the extension 5 and on the mating receptacle 6 in the vicinity of the bearing surfaces 8, 9, along a center line 17, and permanently connecting them together by connecting means that includes, for example, locking rivets with collars which allow rather large gap widths between the surfaces to be joined.

To bring the pair of joint surfaces 3, 4 of the components 1, 2 into the desired contact with as little space as possible remaining between them, instead of a hose 12, another pressure body can be used, e.g. a mechanically expandable mandrel or an eccentric rod.

Figure 2:
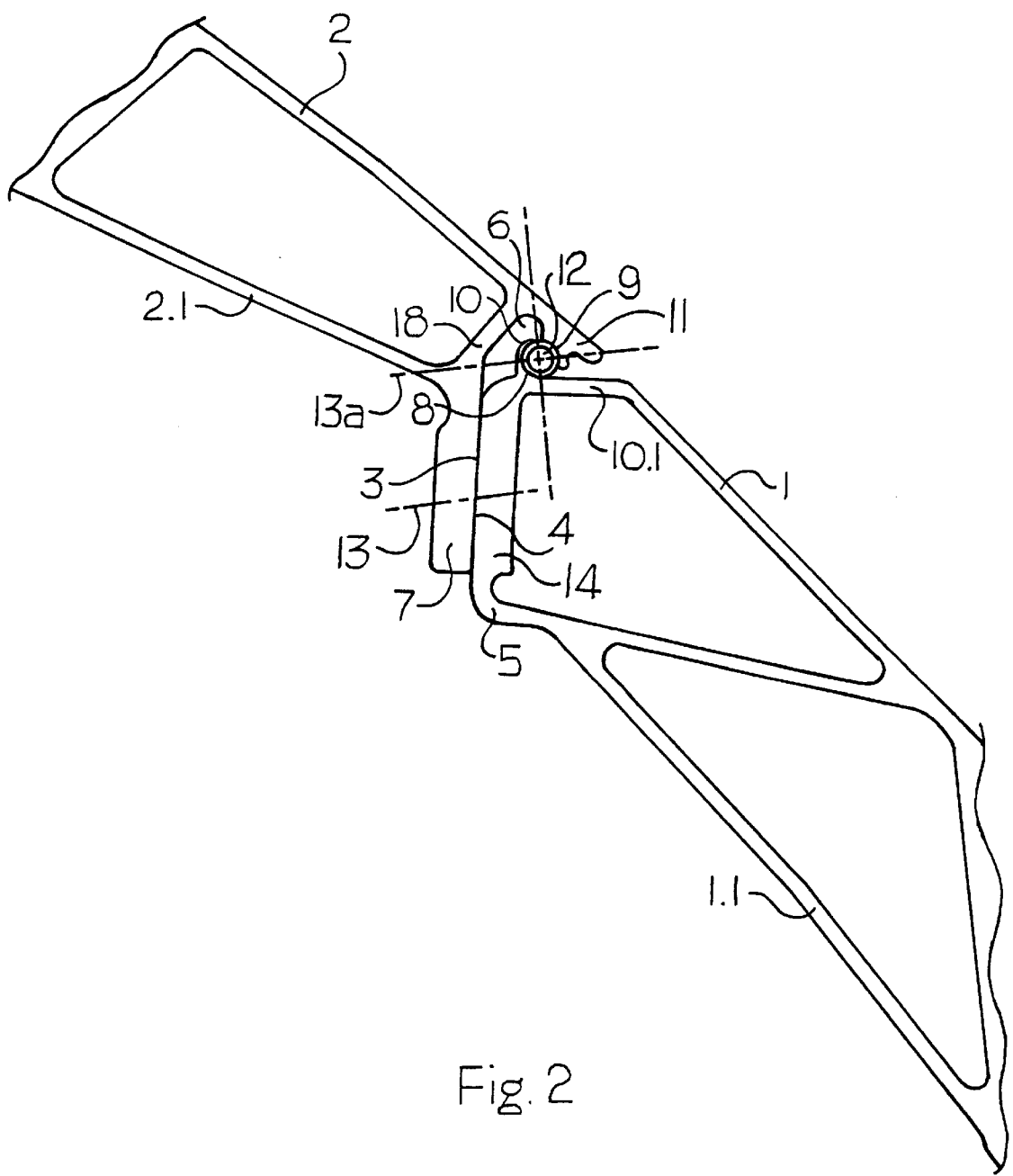
FIG. 2 shows a modular unit which consists of two components interacting in a curved segment.

In the exemplary embodiment illustrated in FIG. 2, the components 1 and 2 form a side wall and the roof wall of a freight car body for a railway vehicle, whereby the position of the connection claimed by the invention is located in the curved transition between the two components 1 and 2 which are defined in the form of extruded profiles. The outer profile web walls thereby represent the outer contour of the freight car body, and the transition between the two segments is continuous, and is located in a correspondingly curved plane in the vicinity of the connection. On an inner wall 2.1 of the component 2 which is defined in the form of the roof module, there is an at least approximately vertical angular web 7 which, on its side facing away from the inside of the car, has a joint surface 3. The outer wall of the component 2 projects beyond a bearing web 18 which connects the outer wall 2 and the inner wall 2.1, and beyond toward the outer wall of the component 1 and, on its inside facing the angular web 7 has a concavely curved bearing surface 9. Between this component wall 11 and the angular web 7, a mating receptacle 6 is formed in which the corresponding extension 5 of the component 1 defined in the form of a side wall module is inserted. A component web 14 which runs at some distance from the outer wall of the component 1, which web 14 is connected to an inner wall 1.1 of the component 1, is equipped with the corresponding joint surface 4 which in the final assembled position illustrated is in flush contact with the corresponding joint surface 3 of the roof module component 2. To make it possible to exert the force required for the at least approximately clearance-free contact between the joint surfaces 3, 4 between the two components 1, 2, on the component 1 there is a component wall 10 which is in turn inserted into the corresponding mating receptacle 6. The component wall 10 is molded onto a bearing web 10.1 which, on the upper end, connects the outer wall of the component 1 with the component web 14 which has the corresponding joint surface 4. The component wall 10 with the bearing surface 8 faces the component wall 11 with the bearing surface 9, and has a symmetrical concave curvature so that an expansion body, in particular a hose, can also be inserted, the cavity 12 of which can be filled with a pressurized support medium to achieve the necessary support force to press the joint surfaces 3, 4 closely together. A boring can then be bored along the center line 13 through the components 7, 14, and then the webs 7, 14 which are in contact with one another under pressure can be riveted together with the at least approximately complete elimination of any gap between them. Then the expansion body between the bearing surfaces 8, 9 can be depressurized and removed, if necessary, when, if a hose is used, it is not intended to be left between the bearing surfaces 8, 9 as a seal.

What is claimed is:

1. A modular unit for car bodies for railway vehicles, comprising:

a first component and a second component in partial engagement with one another, the first component and the second component each including a joint surface adapted to cooperate with the joint surface of the other component, and the first component and the second component each including a bearing surface, the first component and the second component each further including a clamping bracket; and expansion body positioned between the bearing surface of the first component and the bearing surface of the second component, wherein the bearing surface of the first component is arranged substantially parallel to and opposing the bearing surface of the second component so that at least one common normal line runs through the joint surfaces and the bearing surfaces, wherein the distance between the joint surface and the bearing surface of the first component is at least 0.5 millimeters less than the distance between the joint surface and the bearing surface of the second component, wherein the clamping bracket of the first component is connected to the clamping bracket of the second component by fasteners, and wherein the joint surfaces are connected to each other by fasteners.

2. The modular unit as claimed in claim 1, wherein the difference between the distances is at least 3 mm.

3. The modular unit as claimed in claim 2, wherein at least one bearing surface is defined in the form of a concave depression.

4. The modular unit as claimed in claim 1, wherein at least one bearing surface is defined in the form of a concave depression.

5. The modular unit as claimed in claim 1, wherein the first component has an extension which is engaged in a mating receptacle on the second component, the extension has the bearing surface of the first component located on a side of a first component wall which faces away from the joint surface of the first component, and the mating receptacle has the bearing surface of the second component located on a side of a second component wall which faces the joint surface of the second component.

6. The modular unit as claimed in claim 1 wherein the joint surfaces are substantially planar and free of interlocking components.

7. A method for joining a modular unit for connecting large modules on car bodies for railway vehicles, comprising the steps of:

providing at least two components, wherein the two components include a first component and a second component, the first component and the second component each including a joint surface adapted to cooperate with the joint surface of the other component, and the first component and the second component each including a bearing surface;

wherein the bearing surfaces and the joining surfaces are aligned perpendicular to a common normal line;

engaging the joint surface of the first component with the joint surface of the second component so that the bearing surface of the first component faces the bearing surface of the second component and the bearing surfaces of the first and second components are distant from the joint surfaces of the first and second components;

applying a bearing force between the bearing surfaces directed toward the joint surfaces of the first component and the second component until the joint surfaces are substantially in engagement;

drilling through the joint surfaces;

clamping the joint surfaces together with fasteners; and withdrawing the bearing force between the bearing surfaces.

8. An assembly device for a modular unit for connecting large modules on car bodies for railway vehicles, comprising:

a first component and a second component which are in partial engagement with one another with some clearance therebetween, the components each have a pair of joint surfaces which are oriented substantially parallel to one another, and the components each have a bearing surface which opposes the bearing surface of the other component, wherein the bearing surfaces are adapted to interact with the joint surfaces and face away from the joint surfaces, and wherein a normal line runs through the bearing surfaces and the joining surfaces; and an expansion body inserted between the bearing surfaces, wherein when the expansion body is radially expanded, the joint surfaces are placed in engagement and connected to each other by fasteners, wherein the joint surfaces are substantially planar and free of interlocking components.

9. The assembly device as claimed in claim 8, wherein the expansion body is an elastically expandable hose.

* * * * *